(12) United States Patent
Van Herpen et al.

(10) Patent No.: US 8,227,999 B2
(45) Date of Patent: Jul. 24, 2012

(54) LIGHT OUTPUT DEVICE

(75) Inventors: Maarten Marinus Johannes Wilhelmus Van Herpen, Eindhoven (NL); Markus Cornelius Vermeulen, Eindhoven (NL); Gerardus Johannes Josephus Vanlier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

(21) Appl. No.: 12/602,178

(22) PCT Filed: May 30, 2008

(86) PCT No.: PCT/IB2008/052116
§ 371 (c)(1),
(2), (4) Date: Nov. 30, 2009

(87) PCT Pub. No.: WO2008/149268
PCT Pub. Date: Dec. 11, 2008

(65) Prior Publication Data
US 2010/0171437 A1  Jul. 8, 2010

(30) Foreign Application Priority Data
Jun. 4, 2007  (EP) .................................... 07109486

(51) Int. Cl.
*H05B 41/24* (2006.01)
(52) U.S. Cl. .................... 315/250; 315/185 R; 315/312; 362/800
(58) Field of Classification Search ................ 315/169.1, 315/185 R, 250, 251, 291, 294, 307, 312; 345/39, 40, 76, 79, 82, 102, 106, 204, 208, 345/211; 362/227, 365, 800; 257/88–99
See application file for complete search history.

(56) References Cited

U.S. PATENT DOCUMENTS

| | | | |
|---|---|---|---|
| 5,218,351 A | 6/1993 | Hashikawa | |
| 6,270,236 B1 | 8/2001 | Brussog et al. | |
| 6,461,019 B1 * | 10/2002 | Allen | 362/249.06 |
| 6,547,249 B2 * | 4/2003 | Collins et al. | 257/88 |
| 7,009,199 B2 | 3/2006 | Hall | |
| 2001/0007360 A1 | 7/2001 | Yoshida et al. | |
| 2005/0057929 A1 * | 3/2005 | Yano et al. | 362/240 |
| 2005/0254243 A1 * | 11/2005 | Jiang et al. | 362/249 |
| 2006/0275599 A1 * | 12/2006 | Lefevre | 428/332 |
| 2007/0273299 A1 * | 11/2007 | Miskin et al. | 315/250 |

FOREIGN PATENT DOCUMENTS

| | | |
|---|---|---|
| DE | 10019888 A1 | 10/2001 |
| EP | 0105818 A1 | 4/1984 |
| EP | 1970195 A1 | 9/2008 |

* cited by examiner

*Primary Examiner* — Jacob Y Choi
*Assistant Examiner* — Jimmy Vu
(74) *Attorney, Agent, or Firm* — Mark L. Beloborodov

(57) ABSTRACT

A light output device comprises a substrate arrangement with a plurality of light source device arrangements integrated into the structure of the substrate arrangement. The plurality of light source device arrangements comprise at least first and second light source devices (4a,4b) which are arranged in anti-parallel. This arrangement mounts at least two light source devices in anti-parallel within an integrated light source structure, so that they can be controlled independently from shared control lines.

13 Claims, 5 Drawing Sheets

LIGHT OUTPUT DEVICE

FIELD OF THE INVENTION

This invention relates to light output devices, in particular using discrete light sources associated with a light transmissive substrate structure.

BACKGROUND OF THE INVENTION

One known example of this type of lighting device is a so-called "LED in glass" device. An example is shown in FIG. 1. Typically a glass plate is used, with a transparent conductive coating (for example ITO) forming electrodes. The conductive coating is patterned in order to make the electrodes, that are connected to a semiconductor LED device. The assembly is completed by laminating the glass, with the LEDs inside a thermoplastic layer (for example polyvinyl butyral, PVB). The glass used may be safety glass. Applications of this type of device are shelves, showcases, facades, office partitions, wall cladding, and decorative lighting. The lighting device can be used for illumination of other objects, for display of an image, or simply for decorative purposes.

One problem with this type of device is that it is difficult to provide a structure which enables individual LEDs in the glass to be turned on and off, for example in order to display an image, or a dynamic pattern. This is difficult, because a two-dimensional pattern of transparent electrodes is desired, but crossovers need to be avoided if the layer structure is to be kept simple. If individual wires are used for each LED (instead of a two dimensional pattern), this results in very high wire resistances (for example ITO electrodes), leading to high electrical losses in these wires. An alternative is to place several sheets of LEDs in glass behind each other, which adds to the cost of the device.

Another problem is how to dynamically control the color of the LEDs in glass. Currently, this can again only be achieved by adding extra wires, leading again to thinner ITO wires and thus to extra electronic losses. Furthermore, LED devices are not typically suitable for ac drive voltages, as they have diode electrical characteristics.

It is an object of the invention to provide independent control of the light source devices but with a simple conductor pattern.

SUMMARY OF THE INVENTION

According to the invention, there is provided a light output device comprising a light transmissive substrate arrangement with a plurality of light source device arrangements integrated into the structure of the substrate arrangement, wherein the substrate arrangement comprises first and second substrates and an electrode arrangement sandwiched between the substrates, with the plurality of light source device arrangements connected to the electrode arrangement, wherein the plurality of light source device arrangements comprise at least a first and second light source device, each light source device comprising first and second electrical contacts and providing an electrical conduction path in a forward bias direction from the first to the second contact, and blocking electrical conduction in an opposite, reverse bias, direction, wherein the first and second light source devices are arranged in anti-parallel.

This arrangement uses light source devices that transmit current in one direction only, and mounts at least two light source devices in anti-parallel, so that they can be controlled independently from shared control lines. This enables the control lines to be wider than if individual control lines are required, reducing resistive losses.

By anti-parallel is meant that one is arranged to conduct only in one direction within in a circuit (which circuit includes both light source devices), and the other is arranged to conduct only in an opposite direction within the same circuit.

The second electrical contact of the first light source device and the first electrical contact of the second light source device can be connected to a second common electrode. This provides two light source devices in two connected and parallel branches. The power source can then comprises a dual-polarity current source, with one polarity for each light source device.

A power source is preferably provided, adapted to provide independent control of the first and second light source devices. For example, the two light source devices can be controlled simultaneously by using an ac power source with adjustable dc offset.

The light transmissive substrate material may be transparent (optically clear) or a diffusive transmissive material.

In another arrangement, one or more light source device arrangements comprises a third light source device having first and second electrical contacts and providing an electrical conduction path in a forward bias direction from the first to the second contact, and blocking electrical conduction in an opposite reverse bias direction, wherein the second electrical contact of the third light source device is connected to the common electrode.

This provides an arrangement of three light source devices, with two in parallel and one in anti-parallel. All three share one common electrode but only two other electrodes are required to enable independent control of the three light source devices.

Thus, the first electrical contact of the second light source device can be connected to a first electrode, and the first electrical contact of the third light source device can be connected to a second electrode. The first and second electrodes enable independent control of the second and third light source devices.

The second electrical contact of the first light source device can be connected both to the first electrode and the second electrode without shorting the first and second electrodes. This is the device connected with opposite polarity, and either of the first and second electrodes can then be used to control the device using a polarity signal which does not turn on the other devices.

One or more diodes can be provided between second electrical contacts of the first light source device and the second electrical contacts of the second and third light source devices. These ensure that the two contacts of the first light source device are not shorted together.

In this arrangement, a power source can comprise first and second dual-polarity current sources, one for applying a signal between the common electrode and the first electrode and one for applying a signal between the common electrode and the second electrode. The power source may also comprise a controller for controlling the first and second dual-polarity current sources.

In all embodiments, the substrate arrangement preferably comprises first and second substrates and an electrode arrangement sandwiched between the substrates, wherein the at least one light source device is connected to the electrode arrangement.

The electrode arrangement can comprise an at least semi-transparent conductor arrangement, for example comprising a transparent conductive oxide such as Indium Tin Oxide, Indium Zinc Oxide, Tin Oxide or Fluorine Doped Tin Oxide. The electrical contacts of the light source devices are then connected to regions of the transparent conductor arrangement.

The regions of the conductor pattern can be defined by score lines within an otherwise substantially continuous conductor layer. This provides low resistance contacts.

The electrode arrangement can instead comprise a semi-transparent conductive material, for example gold, silver, copper, zinc or stainless steel. This can be in the form of an ink containing conductive particles.

The light source devices preferably comprise LED devices, for example inorganic LEDs, organic LEDs, polymer LEDs or laser diodes.

Each light source device arrangement can comprises at least two LED chips arranged anti-parallel. Thus, individual LED chips can be used and integrated into the substrate structure and mounted in circuit in accordance with the invention.

The invention also provides a lighting system comprising a light output device as claimed in any preceding claim, and a lighting controller for controlling the signals provided by the power source.

The invention also provides a method of driving a light output device, the device comprising a light transmissive substrate arrangement with a plurality of light source device arrangements integrated into the structure of the substrate arrangement, wherein the plurality of light source device arrangements comprise at least a first and second light source device, each light source device comprising first and second electrical contacts and providing an electrical conduction path in a forward bias direction from the first to the second contact, and blocking electrical conduction in an opposite, reverse bias, direction, wherein the first and second light source devices are arranged in anti-parallel, wherein the method comprises applying an ac voltage to the electrode arrangement to drive the light source devices in sequence, and providing independent control of the output intensity of the first and second light source devices.

The anti-parallel arrangement enables independent control of the light source devices with shared control lines. The ac voltage can have a variable dc offset for controlling the relative intensity of the first and second light source devices, thereby providing independent control.

One or more light source device arrangements may each comprise a third light source device (again having first and second electrical contacts and providing an electrical conduction path in a forward bias direction from the first to the second contact, and blocking electrical conduction in an opposite, reverse bias, direction), and the method then comprises applying two ac voltages to the electrode arrangement to drive two light source devices in a first phase of a sequence and to drive the other light source device in a second phase of the sequence, and providing independent control of the output intensity of the first second and third light source devices.

It is noted that the invention relates to all possible combinations of features recited in the claims.

BRIEF DESCRIPTION OF THE DRAWINGS

Examples of the invention will now be described in detail with reference to the accompanying drawings, in which.

The same reference numbers are used to denote similar parts in the different figures.

DETAILED DESCRIPTION

Figure 1:
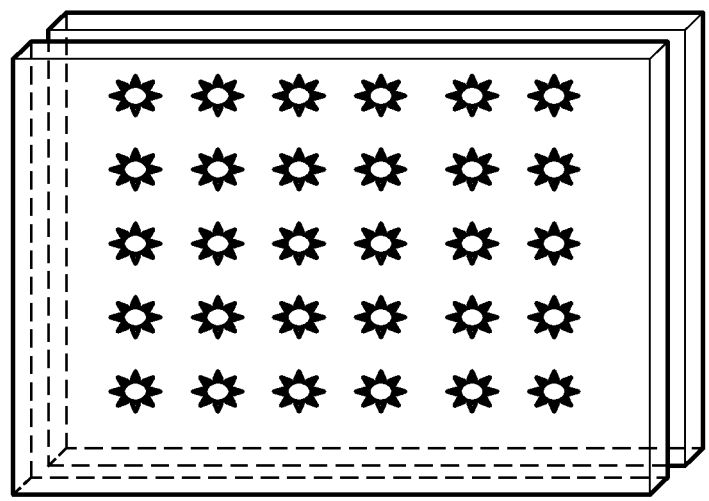
FIG. 1 shows a known LED in glass illumination device.
Figure 2:
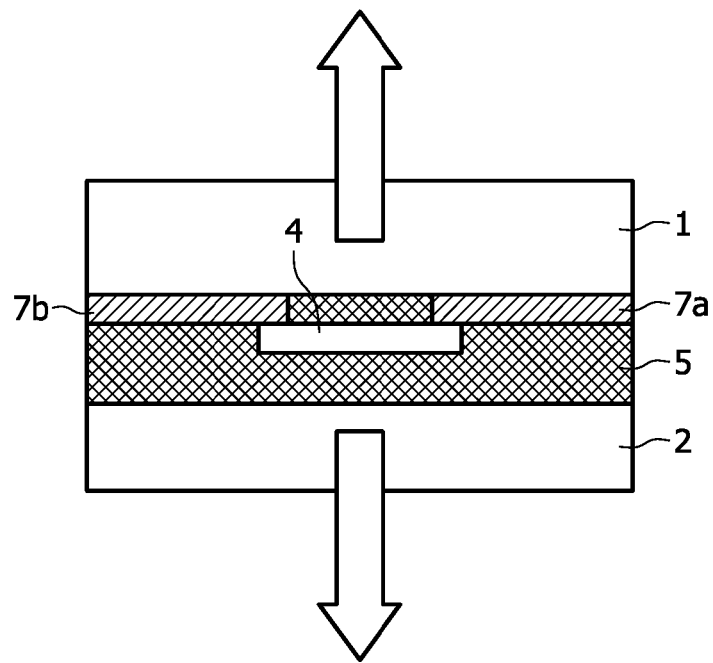
FIG. 2 shows a single LED of the device of FIG. 1 in more detail.

The structure of an LED in glass illumination device is shown in FIG. 2. The lighting device comprises glass plates 1 and 2. Between the glass plates are (semi-) transparent electrodes 7a and 7b (for example formed using ITO), and a LED 4 connected to the transparent electrodes 7a and 7b. A layer of thermoplastic material 5 is provided between glass plates 1 and 2 (for example PVB or UV resin).

The glass plates typically may have a thickness of 1.1 mm-2.1 mm. The spacing between the electrodes connecting to the LED is typically 0.01-3 mm, for example around 0.15 mm. The thermoplastic layer has a typical thickness of 0.3 mm-2 mm, and the electrical resistance of the electrodes is in the range 2-80 Ohm, or 10-30 Ohms/square.

The electrodes are preferably substantially transparent, so that they are imperceptible to a viewer in normal use of the device. If the conductor arrangement does not introduce a variation in light transmission (for example because it is not patterned, or because the pattern cannot be seen), a transparency of greater than or equal to 50% may be sufficient for the system to be transparent. More preferably, the transparency is greater than 70%, more preferably 90%, and even more preferably 99%. If the conductor arrangement is patterned (for example because thin wires are used), the transparency is preferably greater than 80%, more preferably 90%, but most preferably greater than 99%.

The electrodes can be made of a transparent material such as ITO or they can be made of an opaque material such as copper but be sufficiently thin so that they are not visible in normal use. Examples of suitable materials are disclosed in U.S. Pat. No. 5,218,351.

The invention provides an integrated light output device having groups of at least first and second light source devices connected in anti-parallel. It then is possible to provide independent control of the first and second light source devices with shared control lines.

Figure 3:
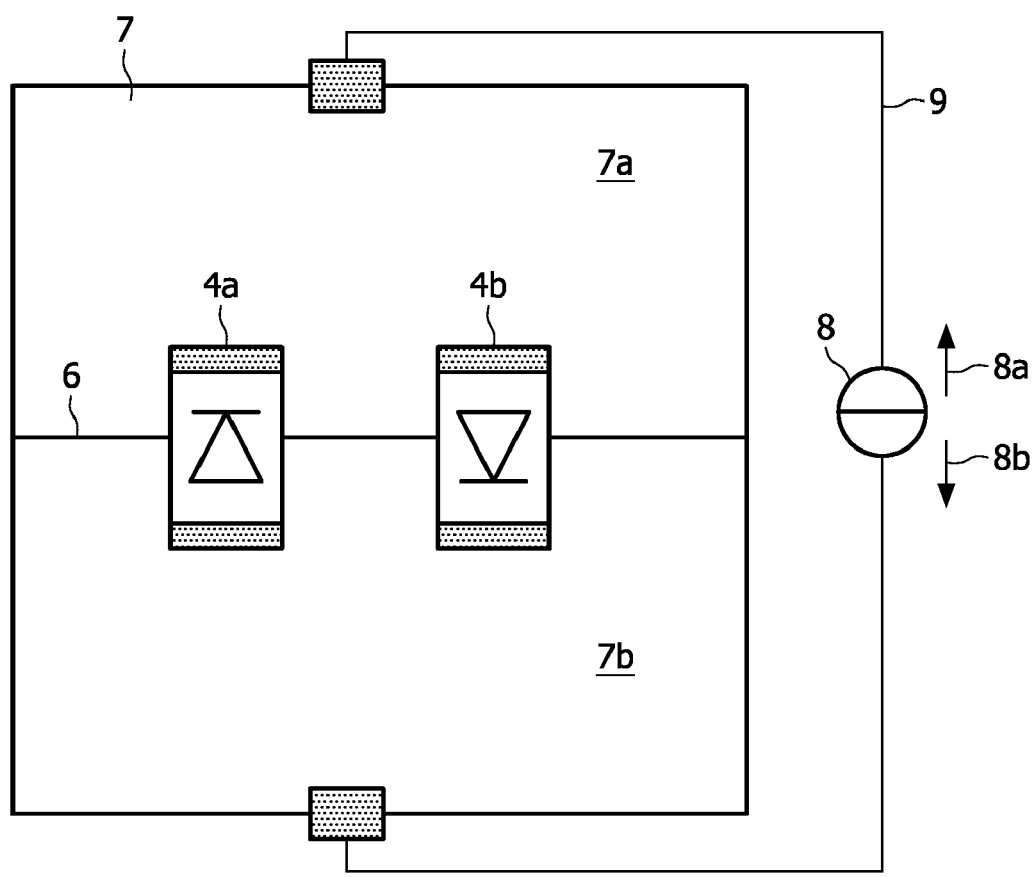
FIG. 3 shows a first example of circuit of the invention for controlling two LEDs.

FIG. 3 shows a first example of circuit of the invention for controlling the LEDs. FIG. 3 shows a glass plate 7 with ITO coating, having a cut 6 in the conductive ITO coating, such that the ITO coating does not conduct electricity over this cut. Two LEDs 4a and 4b are provided, which connect to the ITO coating on both sides of the cut 6, so that one LED terminal is coupled to one ITO region 7a, and the other LED terminal is connected to the other ITO region 7b. Finally, an electrical current supply source 8 is connected to the system, using wires 9.

The LEDs are connected with opposite polarity to the two ITO regions. Thus, one ITO region 7a connects to the cathode of LED 4a and the anode of LED 4b, and the other ITO region 7b connects to the anode of LED 4a and the cathode of LED 4b.

If the current supply source 8 generates a current in direction 8a, only LED 4b will turn on, because LED 4a is in reverse bias direction. Similarly, if the current is generated in direction 8b, only LED 4a will turn on. Thus, by varying the direction of the current between directions 8a and 8b, it is possible to selectively turn the LEDs 4a and 4b on.

In some cases, it is desired to be able to regulate the intensity difference between two types of LEDs 4a and 4b. For example, this may be used to regulate the color temperature, or to mix colors in a multi colour system (for example an RGB, or RGBA system).

In order to achieve this, an AC current supply can be used which has a desired offset. By moving the offset up or down, the amount of time that a certain LED is on can be regulated, and thus the intensity of the LED can be regulated. This principle is illustrated in FIGS. 4 and 5.

Figure 4:
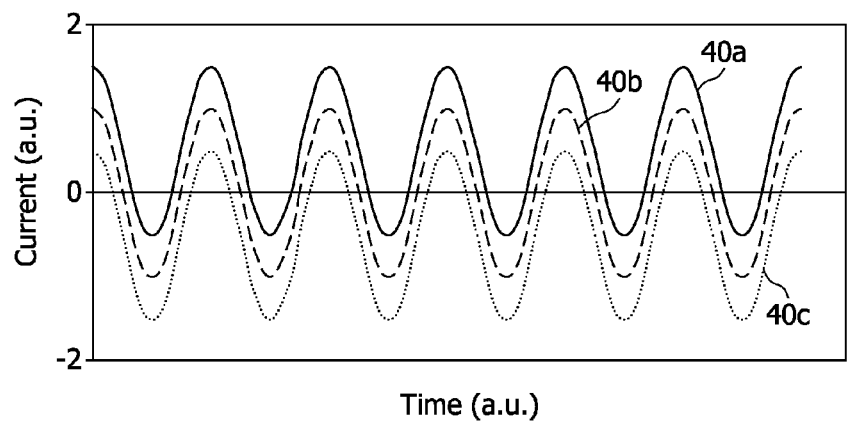
FIG. 4 is a first graph to explain how to control the light source device in FIG. 3.

In FIG. 4, a comparison between different signals is shown. By shifting the alternating current drive level, the duty cycle is changed for the two LEDs. With an alternating current signal having a positive mean value as shown by plot 40a, the LED 4b is brighter, as the positive duty cycle period is longer than the negative duty cycle period, whereas the LED 4a is dimmer.

With an alternating current signal having a negative mean value as shown by plot 40c, the LED 4a is brighter, as the negative duty cycle period is longer than the positive duty cycle period, whereas the LED 4b is dimmer. For a signal with zero offset, the brightness is the same (plot 40b).

Figure 5:
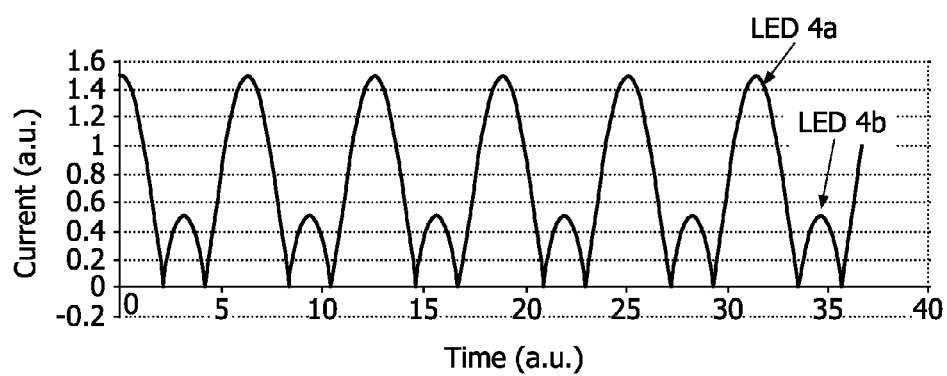
FIG. 5 is a second graph to explain how to control the light source device in FIG. 3.

FIG. 5 shows the current flowing through LEDs 4a and 4b, when a drive current for the bright LED 4a (plot 40c) is used.

Figure 6:
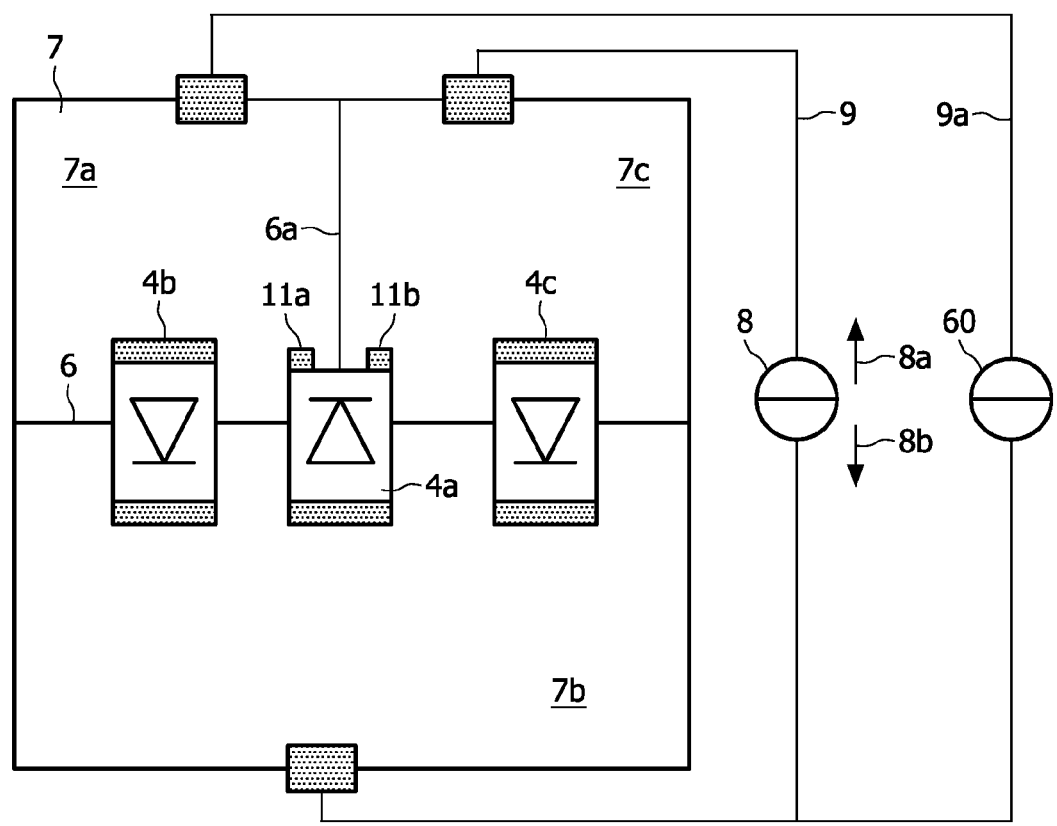
FIG. 6 shows a second example of circuit of the invention for controlling three LEDs.

In a further embodiment, three different LEDs can be driven, as shown in FIG. 6.

In the example of FIG. 6, in order to achieve one more degree of multiplexing, an extra conductor path is added, using an extra cut 6a in the ITO coating. This creates three ITO regions, 7a, 7b, 7c.

The drive circuitry comprises two current sources 8 and 60, and an extra set of connector wires 9a.

The first LED 4a (i.e. the one with the same polarity as the first LED 4a in FIG. 3) is connected between the first and second regions 7a, 7b, with the cathode connected to the first region 7a and the anode connected to the second region 7b. The LED 4a can in fact be connected to either of the regions 7a, 7c, or to both as shown in order to reduce electrical loss (explained below). With the cathode connected to both ITO regions 7a, 7c, it is connected on both sides of the ITO cut 6a, using connector points 11a and 11b.

The second LED 4b is connected between the first and second regions 7a, 7b, with the anode connected to the first region 7a and the cathode connected to the second region 7b. The first and second LEDs 4a,4b are thus again in anti-parallel as in FIG. 3.

The third LED 4c is parallel with the second LED 4b, with its anode connected to the ITO region 7c and its cathode connected the common electrode 7b.

LEDs 4b and 4c thus share the cathode connection, but have individual anode connections.

If the first current source 8 is driven in direction 8a, the LED 4c will be turned on and similarly if the second current source 60 is driven in direction 8a, the LED 4b will be turned on. It can thus be seen that the second and third LEDs can be driven independently.

Either current source 8, 60 can be used to turn on LED 4a. When both current sources are used the current can now flow through both contacts 11a and 11b, due to which the total resistance of the conductor path for LED 4a is reduced (in this example by 50%).

This arrangement thus has one common electrode for a set of three LEDs, and two other drive electrodes. Two LEDs 4b,4c are driven with the same polarity, each by a respective one of the "other drive electrodes", whereas the other LED 4a can be driven with an opposite polarity signal using either one or both of the "other drive electrodes".

The connectors 11a and 11b do not make a shortcut between the layers split by ITO cut 6a. The LED 4a thus requires isolated contacts 11a, 11b as part of its design. If this is not provided internally in the package of the LED, this may be achieved with additional diodes, as discussed further below.

This embodiment may for example be used for mixing red-green-blue LEDs. The LED using the most current can be placed in the position of LED 4a.

The colour mixing can be carried out in two phases—a first phase for LEDs 4b and 4c with LED 4a turned off, and a second phase for LED 4a, with LEDs 4b and 4c turned off.

By using AC signals for the power sources, the power source signals will alternate between these two phases, and they are not perceptible to the user. Thus, the user sees simultaneous control of the brightness of all three LEDs.

Using the approach described above it is also possible to mix more than 3 colors, for example mixing Red-Green-Blue-Amber.

In general, by applying a voltage between regions 7a and 7b, the LED 4b can be turned on.

By applying a voltage between 7c and 7b, the LED 4c can be turned on.

By applying a reverse voltage between either regions 7a and 7b and/or between 7c and 7b, the LED 4a will turn on.

By providing suitable voltages, it is possible to control the output from all three LEDs independently as outlined above. Offset voltages can be used as described above so that the reverse voltage cycle has different amplitude to the forward voltage cycle, with the reverse cycles controlling the diode 4a and the forward cycles controlling the diodes 4b, 4c.

More diodes may be added to improve the system. For example, additional diodes can be provided near LED 4b and LED 4c, in order to suppress cross-talk between the conductor paths for LEDs 4b and 4c.

As mentioned above, the LED 4a requires two isolated contact terminals if it is to be driven by either of the two drive electrodes. These may for example be added to the LED package, or they may be soldered together with the LEDs on the ITO layer.

Figure 7:
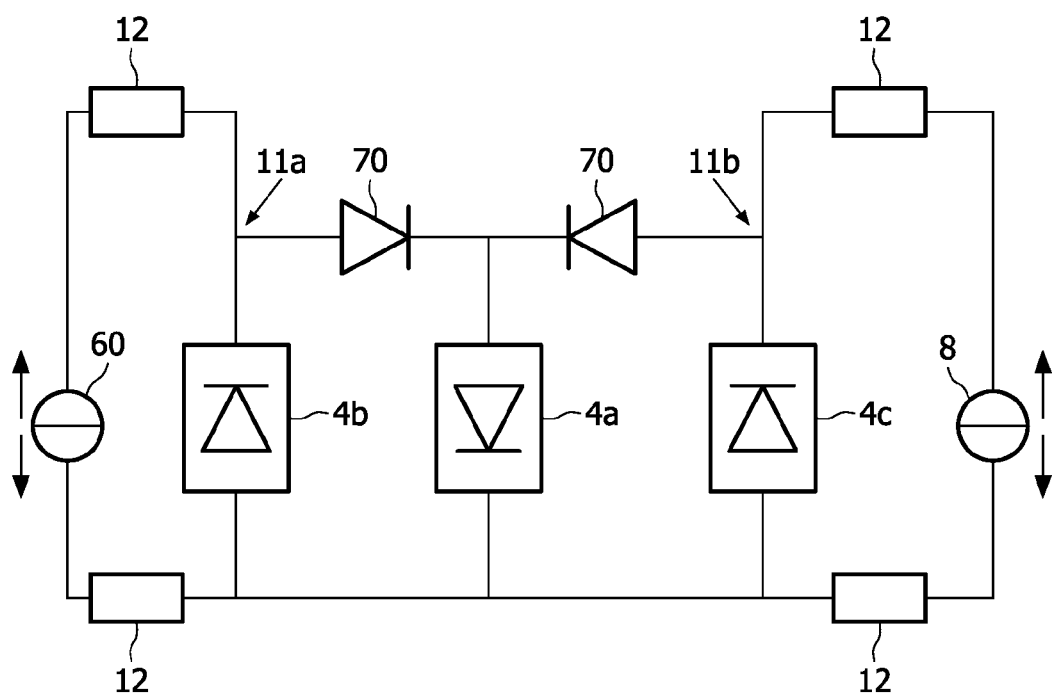
FIG. 7 shows a modification to FIG. 6.

FIG. 7 represents the electrical circuit of FIG. 6 with extra diodes 70 added to prevent short circuit between the contacts 11a and 11b. The ITO resistances are shown as resistors 12. FIG. 7 also shows the diodes connected with opposite polarity to illustrate the fact that the polarity can be reversed without affecting the operation of the circuit.

Typically, the maximum reverse voltage for a LED will be greater than the maximum reverse voltage provided in the circuits above, and thus the anti-parallel placement works well. However, in some cases it may be desirable to reduce the reverse bias voltages applied to the LEDs. Additional diodes can be added to the system, in order to increase the maximum acceptable reverse voltage, which is then a combination of the LED permitted reverse bias voltage and the added diode voltage drops.

The examples above have shown individual LED groups. However, it will be understood that the invention is typically implemented as many LED LED groups, embedded in a large glass plate. A typical distance between the LED groups may be 1 cm to 10 cm, for example approximately 3 cm.

The examples above use glass substrates, but it will be apparent that plastic substrates may also be used.

A small number of possible materials to form the transparent (or at least semi-transparent) electrodes have been outlined above. Other examples can be found in U.S. Pat. No.

5,218,351, and include electrically conductive wires, with a diameter of approximately 0.1 mm spaced by about 10 mm or more, or with a diameter of approximately 20 um and spaced by 1 mm or more. The wires can be made from strands of gold, silver, copper, zinc or stainless steel. Alternatively, strands made of a resin such as polyester or nylon wires can be used, the outer surface of which is coated with metal by vapour deposition, metal plating or the like. Conductive films of vapour-deposited SiO2-indium alloy can also be used.

Thus, wires may be used instead of contact pads as shown, and the advantage of reducing the number of lines is still obtained.

A conductive ink can also be used, which can be deposited by inkjet or silkscreen printing. The ink includes fine metal particles, such as silver, and has a conductance of less than 0.1 Ohm/square/mil. A typical wire width using ink is 0.08 mm to 0.8 mm.

Various modifications will be apparent to those skilled in the art.

The invention claimed is:

1. A light output device comprising a light transmissive substrate arrangement with a plurality of light source device arrangements integrated into the structure of the substrate arrangement, wherein the substrate arrangement comprises first and second substrates and an electrode arrangement sandwiched between the substrates, with the plurality of light source device arrangements connected to the electrode arrangement, wherein the plurality of light source device arrangements comprise at least a first and second light source device, each light source device comprising first and second electrical contacts and providing an electrical conduction path in a forward bias direction from the first to the second contact, and blocking electrical conduction in an opposite, reverse bias, direction, wherein the first and second light source devices are arranged in anti-parallel, wherein the first electrical contact of the first light source device and the second electrical contact of the second light source device are connected to a common electrode, wherein a light source device arrangement from plurality of light source device arrangements comprises a third light source device having first and second electrical contacts and providing an electrical conduction path in a forward bias direction from the first to the second contact, and blocking electrical conduction in an opposite, reverse bias, direction, and wherein the second electrical contact of the third light source device is connected to the common electrode.

2. The device as claimed in claim 1, wherein the plurality of light source device arrangements are embedded in a thermoplastic layer.

3. The device as claimed in claim 1, wherein the device further comprises a power source adapted to provide independent control of the first and second light source devices.

4. The device as claimed in claim 3, wherein the power source comprises a dual-polarity current source.

5. The device as claimed in claim 4, wherein the power source comprises an AC power source with adjustable DC offset for controlling the first and second light source devices simultaneously.

6. The device as claimed in claim 1, wherein the first electrical contact of the second light source device is connected to a first electrode, and the first electrical contact of the third light source device is connected to a second electrode.

7. The device as claimed in claim 6, wherein the second electrical contact of the first light source device is connected both to the first electrode and the second electrode without shorting the first and second electrodes.

8. The device as claimed in claim 7, further comprising one or more diodes between the second electrical contact of the first light source device and the second electrical contacts of the second and third light source devices.

9. The device as claimed in claim 7, wherein the device further comprises a power source which comprises first and second dual-polarity current sources, one for applying a signal between the common electrode and the first electrode and one for applying a signal between the common electrode and the second electrode.

10. The device as claimed in claim 1, wherein the electrode arrangement comprises at least semi-transparent conductor arrangement, the electrical contacts of the light source devices are connected to regions of the transparent conductor arrangement.

11. The device as claimed in claim 10, wherein the electrode arrangement comprises substantially translucent or transparent material comprising Indium Tin Oxide, Indium Zinc Oxide, Tin Oxide or Fluorine Doped Tin Oxide.

12. The device as claimed in claim 1, wherein the light source devices comprise LED devices, the device further comprising a lighting controller for controlling the signals provided to the light output device.

13. A method of driving a light output device, the device comprising a light-transmissive substrate arrangement with a plurality of light source device arrangements integrated into the structure of the substrate arrangement, wherein the plurality of light source device arrangements comprise at least a first and second light source device, each light source device comprising first and second electrical contacts and providing an electrical conduction path in a forward bias direction from the first to the second contact, and blocking electrical conduction in an opposite, reverse bias, direction, wherein the first and second light source devices are arranged in anti-parallel, wherein the method comprises applying an ac voltage to the electrode arrangement to drive the light source devices in sequence, and providing independent control of the output intensity of the first and second light source devices, wherein the AC voltage has a variable DC offset for controlling the relative intensity of the first and second light source devices, wherein one or more light source device arrangements comprises a third light source device having first and second electrical contacts and providing an electrical conduction path in a forward bias direction from the first to the second contact, and blocking electrical conduction in an opposite, reverse bias, direction, wherein the method comprises applying two ac voltages to the electrode arrangement to drive two light source devices in a first phase of a sequence and to drive the other light source device in a second phase of the sequence, and providing independent control of the output intensity of the first, second and third light source devices.

* * * * *